UNITED STATES PATENT OFFICE.

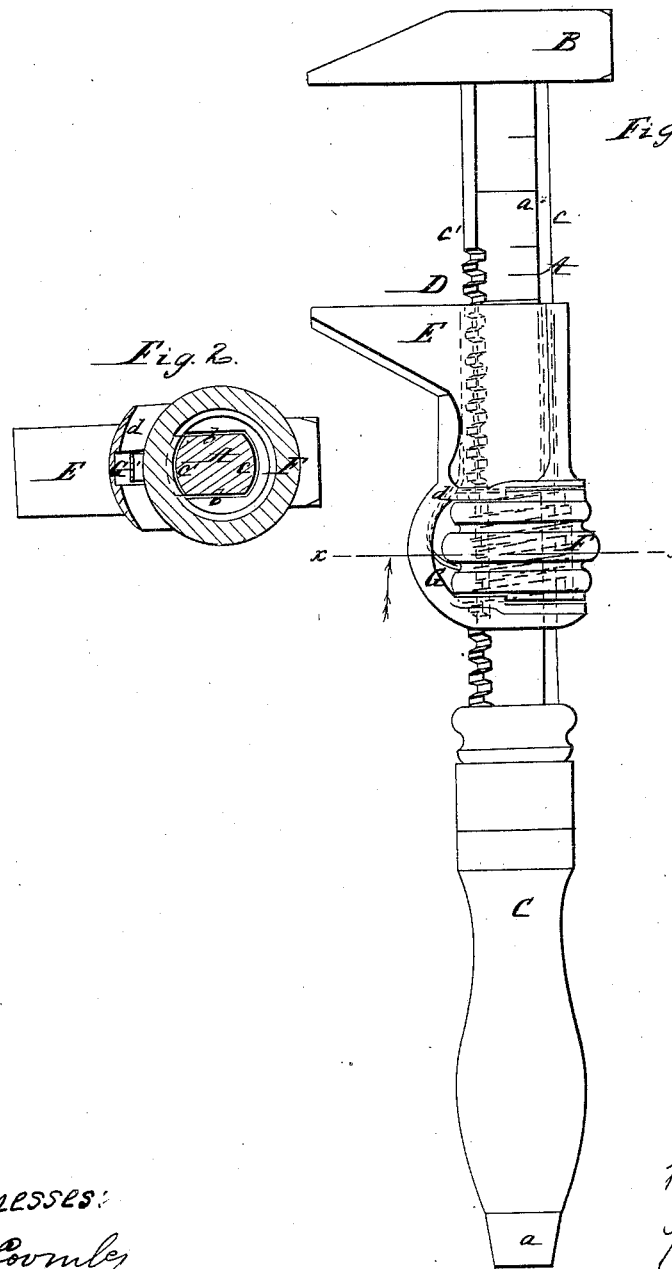

WILLIAM MASON, OF WARREN, MASSACHUSETTS, ASSIGNOR TO HIMSELF AND LUCIUS N. FAY, OF SAME PLACE.

•WRENCH.

Specification of Letters Patent No. 31,576, dated February 26, 1861.

*To all whom it may concern:*

Be it known that I, WILLIAM MASON, of Warren, in the county of Worcester and State of Massachusetts, have invented a new and Improved Screw-Wrench; and I do hereby declare that the following is a full, clear, and exact description of the same, reference being had to the annexed drawings, making a part of this specification, in which—

Figure 1 is a side view of my invention. Fig. 2 is a transverse section of the same, taken in the line $x$, $x$, Fig. 1, and looking in the direction indicated by the arrow.

Similar letters of reference indicate corresponding parts in the two figures.

The object of this invention is to obtain a screw wrench that will be of extremely simple construction, durable, economical to manufacture, and one that may be adjusted properly to its work, with the greatest facility; and also used as calipers when desired.

To enable those skilled in the art to fully understand and construct my invention I will proceed to describe it.

A represents the tang or bar which has a stationary jaw B, at one end, the opposite end passing through a handle C, and firmly secured therein by a nut $a$. The portion of the tang or bar A, between the jaw B, and the handle C, has two plane parallel sides $b$, $b$, and the two opposite sides $c$, $c'$, are convex, the latter having a screw thread D, on it.

On the tang or bar A, a sliding jaw E, is fitted and allowed to slide freely. This jaw E, is provided with a shank $d$, in which a nut F, is placed, said nut being on the bar A, and having an internal diameter larger than the diameter of the bar A, so that a certain degree of lateral play or movement will be allowed the nut on the bar. The screw thread D, however, is formed so as to engage with the nut F, and as the latter is larger in diameter than the bar A, in order to admit of the lateral play above alluded to, it follows of course that the screw thread D, is cut on a cylinder of larger diameter than the bar A, as will be fully understood by referring to Fig. 2.

The back part of the shank $d$, and the greater portion of the sides are open so as to expose the nut F, that it may be readily grasped by the fingers of the operator; and within the shank $d$, there is placed a spring G, the lower or inner end of which bears against the nut F, and keeps the same in gear with the screw thread D,—see Fig. 1.

The nut F, when engaged with the screw thread, retains the sliding or movable jaw E, on the bar A, and by turning the nut, the jaw E, may be adjusted firmly to its work, the nut, head, or other article being firmly secured between the two jaws B, E. The movable jaw E, however is moved directly in contact with its work, the jaw F, being shoved along on the bar A, in consequence of the operator pressing the nut F, with his thumb, thereby increasing the strength of spring G, and disengaging the nut F, from the screw thread D, the jaw E, being shoved along on the bar A, by the thumb. When the movable jaw is thus brought directly against its work, the nut F, is relieved of the pressure of the thumb, and the spring G, throws the nut in gear with the screw thread D; the operator then turns the nut with his fingers and thereby forces the jaw against the article with which it is in contact, and causes the same to be firmly clamped between the two jaws. Thus it will be seen that the expeditious adjustment of the ordinary slide wrench is obtained with the clamping power possessed by the screw wrench, the clamping power which the slide wrench lacks being obtained, and the slow, tedious movement of the screw wrench being avoided. The bar A, is graduated into inches and fractional parts thereof, as shown at $a^*$, to serve as a guide in adjusting the movable jaw E, and allowing the implement to be used as calipers when desired. Any form of jaws may be used. Those with parallel faces as shown in the drawings, being used for grasping and turning polygonal nuts, heads, etc. For grasping gas pipes and other cylindrical articles different shaped jaws are required.

I do not claim the application of a nut and screw to wrenches irrespective of the construction and arrangement herein shown and described, for said parts have been used and arranged in various ways; but I do claim as new and desire to secure by Letters Patent:

The combination of the vibratory nut F and spring G with the bar A and movable jaw E, in the manner and for the purpose substantially as herein shown and described.

WILLIAM MASON.

Witnesses:
DANIEL HITCHCOCK,
JOS. F. HITCHCOCK.